United States Patent [19]

Everett

[11] 4,441,592

[45] Apr. 10, 1984

[54] BICYCLE BRAKE ASSEMBLY

[75] Inventor: Richard C. Everett, Lake Oswego, Oreg.

[73] Assignee: Kool-Stop International Inc., Lake Oswego, Oreg.

[21] Appl. No.: 412,204

[22] Filed: Aug. 27, 1982

[51] Int. Cl.³ .................. F16D 69/04; F16D 65/78
[52] U.S. Cl. ....................... 188/264 A; 188/250 B; 188/24.12; 403/408
[58] Field of Search ............ 188/24.11, 24.13, 24.14, 188/24.19, 73.1, 250 R, 250 G, 250 B, 264 A, 264 R, 344, 24.12; 403/408, 90, 4

[56] References Cited

U.S. PATENT DOCUMENTS

| | | | |
|---|---|---|---|
| 3,776,333 | 12/1973 | Mathauser | 188/24.19 |
| 3,986,585 | 10/1976 | Toplis et al. | 188/250 B |
| 4,036,333 | 7/1977 | Mathauser | 188/24.11 |
| 4,051,924 | 10/1977 | Yoshigai | 188/24.12 |
| 4,334,599 | 6/1982 | Ritsema et al. | 403/90 |

FOREIGN PATENT DOCUMENTS

| | | | |
|---|---|---|---|
| 2262772 | 1/1974 | Fed. Rep. of Germany | 188/250 B |
| 664754 | 6/1964 | Italy | 188/250 B |
| 13132 | of 1894 | United Kingdom | 188/250 R |
| 23882 | of 1903 | United Kingdom | 188/24.4 |
| 1249922 | 10/1971 | United Kingdom | 188/250 G |
| 2088976 | 6/1982 | United Kingdom | 188/24.19 |

Primary Examiner—Douglas C. Butler
Assistant Examiner—Robert J. Oberleitner
Attorney, Agent, or Firm—Edward E. Roberts

[57] ABSTRACT

A bicycle brake assembly having a heat sink member with generally disk-shaped fins, the member having a planar surface for abuttingly engaging a coplanar surface of a brake shoe member, the brake shoe member having a friction material molded on a thermally conductive support disc configured for thermal engagement with the heat sink member. The heat sink member has an aperture extending therethrough for receiving the stud of the brake shoe member with the parts being separable so that the heat sink member need not be discarded on wearing out of the friction material of the brake shoe member. The aperture of the heat sink member is preferably threaded to maintain a thermally conductive path between the coplanar surface of the brake shoe member and the heat sink surface. The heat sink member provided with a concave recess about the stud, with a first washer member having a matingly configured surface while pivotally engaging the recess. A second washer member and a nut member have similarly configured coacting surfaces with the parts being dimensioned and configured so that with the stud passing through the slotted opening of a caliper brake arm with the first and second washer members on opposite sides thereof, angular positioning of the brake pad relative to the rim may be effected.

12 Claims, 5 Drawing Figures

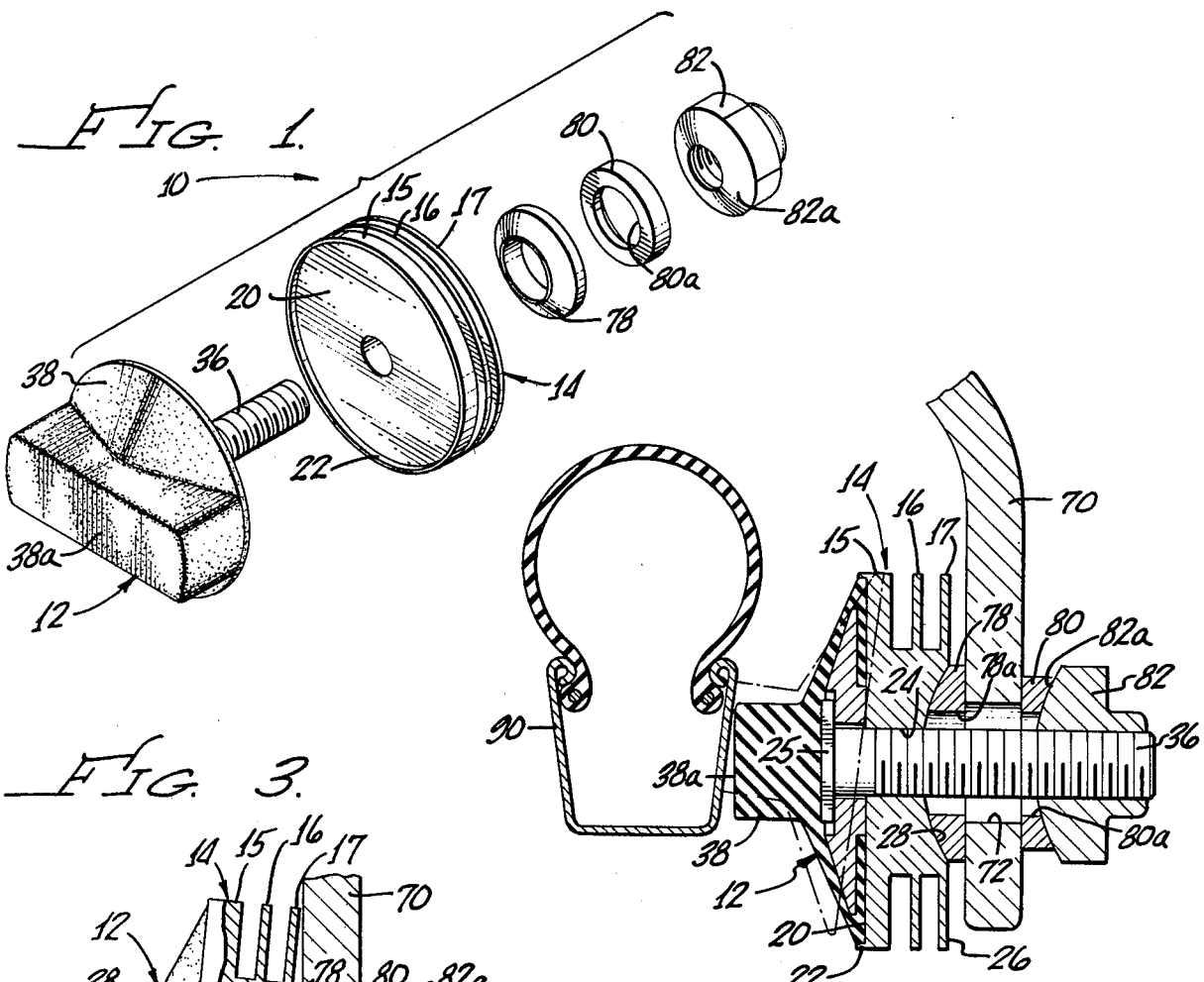
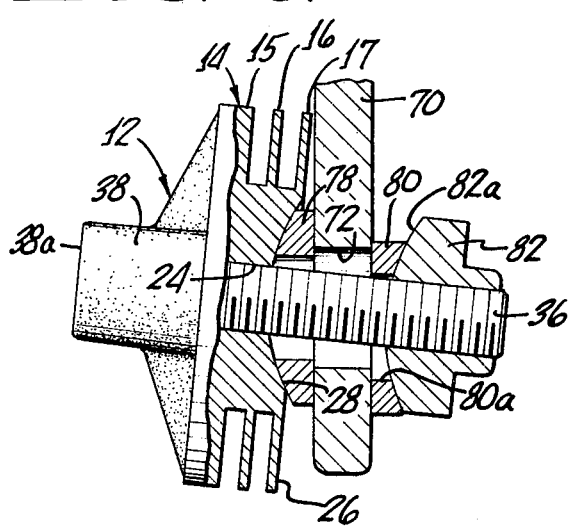

BICYCLE BRAKE ASSEMBLY

BACKGROUND OF THE INVENTION

The background of the invention will be discussed in two parts:

1. Field of the Invention

This invention relates to bicycle brake shoe assemblies, and more particularly to adjustable bicycle brake assemblies having a circular finned heat sink and removable, replaceable brake shoes.

2. Description of the Prior Art

In present day bicycle designs, and particularly bicycles of the lightweight type, the rims are narrow and braking is effected by brake assemblies having brake shoes of friction material configured for urging against the sides of the rims. In most popular bicycles of this type, caliper brake assemblies are ordinarily used. Such caliper brake assemblies have manually actuated brake arms pivotally secured to the frame, with the arms configured for depending down around the tire with the ends of the arms in proximate relation to the opposing sides of the rims. The lower ends of the arms are slotted for receiving brake shoes which have studs for extending through the slots for adjusting the position of the brake pad relative to the rim surface.

In conventional brake shoes of this type, the shoe includes a pad of friction material in generally rectangular configuration bonded to, or molded about a fastener having a rectangular head, the stud of the fastener being passed through the slotted brake arm ends. Other known brake shoes have a metal housing into which is pushed or inserted a block of friction material. With such prior art brake shoes, the transfer of heat generated by the braking action is poor.

An attempt has been made to rectify the poor heat transfer, this attempt being exemplified by the device shown and described in U.S. Pat. No. 4,036,333 for "Bicycle Brake Shoe with Heat Dissipating Means", issued July 19, 1977 to William R. Mathauser. The device of this patent is a finned brake shoe with a pad of friction material thermally bonded thereto. The fins of the brake shoe extend the length of the brake shoe which is generally rectangular in configuration. The patent discloses an alternative embodiment of brake shoe in which a housing having a slotted opening received therein a generally parallelepiped shaped pad of friction material with an intervening strip of metal.

With the first brake shoe of the Mathauser Patent, upon wear of the friction pad, the entire shoe, including the finned heat sink, is discarded and replaced as a unit, thus being relatively uneconomical. In the second embodiment, the inserted pad with the metal strip would appear to be technically inferior due to the possibility of sliding of the pad relative to the housing during braking, unless the pad is suitably bonded to the housing.

It is an object of the present invention to provide a new and improved adjustable bicycle brake assembly.

It is another object of the present invention to provide a new and improved brake assembly having a finned heat sink separable from a brake shoe which may be discarded upon wear of the pad.

It is a further object of the present invention to provide a new and improved brake assembly having a heat sink member with generally disk-shaped fins and a peripheral lip forming a recess for receiving a separable brake shoe device.

It is still another object of the present invention to provide a new and improved brake assembly having improved heat transfer characteristics in an economical configuration.

It is a still further object of the present invention to provide a new and improved fastener for enabling adjustment of the position of the brake shoe relative to the rim.

SUMMARY OF THE INVENTION

The foregoing and other objects of the invention are accomplished by providing a brake assembly having a heat sink member with generally disk-shaped fins, the member having a planar surface with a peripheral lip defining a recess for receiving a matingly configured coplanar surface of a brake shoe member. The brake shoe is formed from a pad of friction material bonded to or molded around a flange of a thermally conductive generally disk-shaped member having a central portion of greater thickness. The central portion has a generally planar surface portion, which together with the surrounding friction material forms the coplanar surface. A stud member has the enlarged head thereof received within a generally matingly configured recess in the central portion opposite the planar surface, the head being held captive by the friction material molded around it. The heat sink member may be provided with a centrally disposed threaded aperture for being received on the stud member for tightening the coplanar surface into abutting thermal relation with the adjacent surface of the heat sink member.

For fastening to the caliper brake arm, one surface of the heat sink member is provided with a concave depression for engaging a washer having a convex surface for coaction therewith, the washer having an enlarged central opening for being received loosely about the stud member. The nut member is threaded for being received on the free end of the stud member, the stud member having a convex surface for engaging a washer having a matingly configured concave surface, the latter washer likewise having an enlarged central opening. With the washers positioned on opposing sides of the caliper brake arm, the brake assembly may be axially displaced relative to the brake arm for insuring proper engagement of the pad with the rim, the fastening being in the nature of a ball and socket arrangement.

Other objects, features and advantages of the invention will become apparent from a reading of the specification, when taken in conjunction with the drawings in which like reference numerals refer to like elements in the several views.

BRIEF DESCRIPTION OF THE DRAWINGS

FIG. 1 is a perspective view of the bicycle brake shoe assembly according to the invention.

FIG. 2 is a cross-sectional view of the bicycle brake shoe assembly of FIG. 1 as assembled on a caliper brake arm and shown relative to the rim of the bicycle;

FIG. 3 is a partial cross sectional view similar to FIG. 2 with the brake shoe assembly angularly displaced relative to the caliper brake arm;

FIG. 4 is a front elevational view of the support disk used for the brake shoe in the brake shoe assembly of FIG. 1; and FIG. 5 is a cross-sectional view of the support disk of FIG. 3 taken along line 5—5 thereof.

DESCRIPTION OF THE PREFERRED EMBODIMENT

Referring now to the drawings and particularly to FIGS. 1 and 2, there is shown a bicycle brake shoe assembly, generally designated 10, the main components including a brake shoe, generally designated 12 and a heat sink 14.

The heat sink 14 is generally cylindrical in form and has a plurality of disk-shaped fins 15-17, the fin 15, of which, is thicker than the remaining fins 16-17. The fin 15 has a generally planar surface 20 which is, but need not be, shown surrounded by a peripheral lip 22 which defines a generally cup-shaped recess, the outer diameter of which is approximately the same as the outer diameter of the brake shoe 20 friction material. Centrally disposed within the heat sink 14 is an axially extending aperture 24, which need not be, but is preferably threaded. The heat sink 14 is formed as a unitary member, from a suitably heat dissipating material such as brass zinc, aluminum or alloys thereof. The fins 15 through 17 are parallel to each other, with the outer surfaces 20 of fin 15 and 26 of fin 17 being planar and parallel. The surface 26 of fin 17 is slightly relieved inwardly around the aperture 24 as illustrated by the concave recess 28. The depth of the fins 15-17 about the central core portion 30 of heat sink 14 is selected for optimum heat transfer characteristics consistent with fabrication of the material used.

The brake shoe 12 has a thermally conductive support disk 34 through which passes a threaded stud member 36 with a brake pad 38 of suitable friction material molded or bonded thereabout. Referring also to FIGS. 4 and 5, the support disk 34 has a generally circular configuration, and is tapered in cross-section (See FIG. 5), as a result of which the central portion 40 is thicker, with the flange portion 42 having a tapering thickness which is thinner the more radially removed from the center portion 40. As best shown in FIG. 5, the right hand surface of the flange portion 42 is generally planar, with the right hand surface of the center portion 40 likewise being a generally planar surface, these surfaces being designated 44 and 46, respectively. As shown the surface 46 extends outwardly from the surface 44 to define an outwardly disposed centrally located hub portion.

An aperture 48 extends centrally through the support disk 34, while a plurality of cutouts 50-55 extend about the periphery of portion 42, equidistant from the aperture 48. A rectangular recess 60 is formed in the center portion 40 of the support disk 34 for matingly receiving the generally similarly configured head 25 of the stud member 36. The support disk 34 is formed from a suitable thermally conductive material, such as brass, zinc, aluminum, or alloys thereof in one piece. Such disks can be conveniently molded with conventional equipment.

As better shown in FIG. 2, with the head 25 of the stud 24 set within recess 60 and the shaft of stud 36 extending through aperture 48 of the support disk 34, the two parts are retained in a suitable fixture and the brake pad 38 is molded thereabout. The brake pad 38 is formed of a suitable friction material such as rubber, synthetic rubber, plastic, nylon or the like, and may or may not be impregnated with metal particles to assist in the heat transfer. The brake pad 38 is generally frusto-conically configured and terminates at the apex thereof with a suitably configured brake shoe 38a, which may be generally parallelepiped in shape or slightly arcuate to the radius of the rim to be contacted by the shoe 38a. In any event, during the molding process the friction material flows through the apertures 50-55 filling the voids therein, and also flows into the space between the surfaces 44 and 46 to generally surround the flange portion 42 of the support disk 34 while leaving the surface 46 exposed (See FIG. 2). As molded, the friction material of the brake pad 38, opposite the shoe 38a forms a surface coplanar with the surface 46, this coplanar surface having an outer diameter equal to, or slightly smaller than the diameter of the recess formed by the lip 22 about the surface 20 of the fin 15 of the heat sink 14.

Referring now to FIGS. 1, 2 and 3, in FIG. 2, there is shown the lower end 70 of a caliper brake arm, the end 70 usually having a slotted opening 72 for passage therethrough of the stud 36 of the brake shoe 12. During assembly, the brake shoe 12 has the stud 36 thereof inserted into aperture 24 of the heat sink member 14. In one embodiment, with the aperture 24 threaded, the heat sink 14 is rotated onto the threaded stud 36 until the surface 20 of fin 15 is in snug abutting engagement with the coplanar surface including the surface 46 of the center portion 40 of the support disk 34 and the adjacent surface of the friction material of the brake pad 38. The friction material, having a slight degree of resilience, serves to lock the parts in the assembled relation shown in FIG. 2. The portion of the friction material between the flange portion surface 44 and the adjacent surface 20 is under slight compression, and the metallic planar surface 46 is in thermally conductive relation with the metallic surface 20 of the heat sink 14.

With the brake shoe 12 thus secured to the heat sink 14, the assembly is then ready for mounting on the caliper brake arm 70. Referring specifically to FIGS. 1 through 3, the fastening means includes first and second washer 70 and 80 and a lock nut 82, each being specially configured. The washer 78 has a first convex surface for matingly engaging the concave recess 28 of the heat sink 14. The opposite surface of the washer 78 is planar, with the opening 78a of the washer being of a greater diameter than the diameter of the stud 36. The second washer member 80 has a first planar surface with the opposite surface having a concave configuration for matingly engaging the convex surface 82a of the lock nut 82. The opening 80a of the second washer member 80 is of greater diameter than the diameter of the stud member 36. For assembly, with the brake shoe 12 secured to the heat sink 14, the stud has the first washer 78 placed thereon with the convex surface thereof matingly engaging the concave recess 28. The stud member 36 is then passed through the slotted opening 72 of the caliper brake arm 70 and the second washer member 80 is positioned thereon with the planar surface thereof in abutting relation with the caliper brake arm 70. The lock nut 82 is then threadably received on the end of stud member 36 with the convex surface 82a thereof oriented toward the concave surface of washer 80.

By reference to FIG. 2, with the brake shoe assembly 10 assembled as illustrated, the brake shoe 38a is in proximate relation to a side surface of a rim 90. In operation, it is preferable that the surface of brake shoe 38a uniformly engage the side surface of the rim 90 for providing maximum braking pressure. As illustrated in FIG. 2, often times the adjacent surface of the rim 90 is tapered, and sometimes there is a misalignment of the caliper brake arm 70 which, if not corrected for, results in uneven contact of the brake shoe 38a with the side surface of the rim 90. That is, in many instances, the leading or trailing edge of the brake shoe 38a in the direction of travel of the rim 90 will make contact first thus resulting in uneven brake pressure and uneven wear. To accommodate this variance, the instant invention includes fastening means which are universally adjustable, that is the braking surface of the brake shoe 38a may be positioned in any of numerous planes relative to the plane of the caliper brake arm 70. This is illustrated in FIG. 2, and particularly in exaggerated form in FIG. 3. With the two washer members 78 and 80 having the planar surfaces thereof in abutting contact with opposing surfaces of the caliper brake arm 70 on opposite sides of the slot 72, the two washer members 78 and 80 collectively act as a ball of a ball and socket arrangement. With the coacting surfaces 82a with washer 80 and washer 78 with recess 28, the stud member 36 may be positioned angularly relative to the axial center line of the slot 72. As shown in dotted lines in FIG. 2, the brake shoe assembly 10 may be pivoted slightly clockwise for enabling flush engagement of the surface of brake shoe 38a with the side surface of rim 90 for maintaining proper contact. Although not illustrated, it is to be understood that the assembly may be pivoted relative to a vertical line extending through the center of caliper brake arm 70 as well to provide adjustment in a direction orthogonal to that shown in the drawings. Similarly if required, other compound angular adjustments may be effected with the fastening means of the instant invention, thus enabling proper adjustment of the assembly relative to the rim 90. Although the fastening means is illustrated with reference to the novel brake shoe assembly of the instant invention, it is to be understood that the fastening means may be utilized with prior art brake shoe assemblies as well.

In operation, as the caliper brake is applied, the brake shoe 38a is urged against the rim 90, thus generating heat, due to the combined pressure and friction. The support disk 34, being of a frusto-conical configuration has a generally large mass and acts as an internal heat sink for enabling the rapid transfer of heat to the more efficient heat sink 14 by means of the intimate contact between the enlarged center portion 40 of the support disk 34 (via surface 46) and the surface 20 of heat sink 14. In addition, due to the broad diameter of the support disk 34, any torsional, or twisting forces caused by the contact of the brake shoe 38a with the rim 90 are resisted. This resistance may be further assisted by the pad 38 firmly resting in the recess defined by the optional lip 22 about the periphery of the surface 20 of the fin 15 of the heat sink 14. With the transfer of heat to the heat sink 14, dissipation into the atmosphere is facilitated by the plurality of fins 15-17, which are aligned in the general direction of travel of the bicycle for enabling ready passage of air through the space between fins.

When the brake shoe 38a is worn beyond use, only the brake shoe 38 need be discarded and replaced while the heat sink 14, which is not subject to unusual wear, may be retained, thus resulting in significant cost savings, since the heat sinks are major cost items.

In an alternative arrangement, although not preferred, the aperture 24 of the heat sink 14 may be unthreaded, in which event the stud 36 is simply passed therethrough with the nut 82 being tightened sufficiently for retaining the parts in position. While this is workable, to insure the intimate contact between the surface 20 of the heat sink 14 and the surface 46 of the support disk 34, threading of the aperture 24 is more desirable.

In accordance with the present invention, there has been shown and described an adjustable bicycle brake assembly 10 which includes a brake pad 38 of friction material molded around an internal heat sink means in the form of an enlarged disk 34 for efficiently transferring heat from the pad 38 to a second heat sink means in the form of a heat sink 14 of a much greater mass having a plurality of disk-shaped fins 15-17 for more efficient heat dissipation, with the heat sink 14 having aligning or seating means for intimate thermal contact between abutting surfaces of conductive material, the aligning means being in the form of the peripheral lip 22 defining a recess for receiving the coplanar surfaces therein. The universally adjustable fastening means enables proper positioning of the shoe 38a relative to the side of rim 90 for optimum braking action. While the description has proceeded with reference to a preferred embodiment, it is to be understood that various other adaptations and modifications may be made within the spirit and scope of the invention.

What is claimed is:

1. In a bicycle brake assembly, the combination comprising:
   (a) heat sink means having at least one generally planar surface;
   (b) a separate brake shoe means including
      (i) a thermally conductive member having a support flange portion and a generally planar surface portion, said planar portion being displaced outwardly from said flange portion; and
      (ii) a pad of friction material secured to and substantially surrounding said support flange portion, one surface of said pad and said generally planar surface of said thermally conductive member forming a generally coplanar surface; and
   (c) means for separably securing said brake shoe means to said heat sink means with said coplanar surface in thermally conductive relation with said at least one generally planar surface of said heat sink means for enabling the transfer of heat from said brake shoe means through said thermally conductive member to said heat sink means and then to the atmosphere during braking action of the bicycle.

2. The combination according to claim 1 wherein said assembly further includes means for aligning said at least one generally planar surface of said heat sink means with said brake shoe means for maintaining said surfaces in abutting intimate thermally conductive relation.

3. The combination according to claim 2 wherein said means for aligning includes a peripheral lip on said generally planar surface of said heat sink means for defining a recess, and said coplanar surface is matingly configured for being received within said recess.

4. The combination according to claim 1 wherein said heat sink means is a finned heat sink member having generally disk-shaped fins.

5. The combination according to claim 4 wherein said thermally conductive member is generally frusto-conically configured with the central portion thereof having a thickness greater than the flange portion.

6. The combination according to claim 5 wherein said pad is molded to said support flange portion and said thermally conductive member has a plurality of cutouts extending through said flange portion for enabling gripping of the friction material during the molding process.

7. The combination according to claim 1 wherein said heat sink means is a generally cylindrically configured heat sink member having a plurality of disk-shaped fins, said generally planar surface of said heat sink means is a surface on one of said fins, said generally coplanar surface abuts against this surface, and said assembly further includes lip means about the periphery of said surface of said one fin for defining a recess for matingly receiving said coplanar surface.

8. The combination according to claim 7 wherein said thermally conductive member is generally disk-shaped with the central portion thereof having a thickness greater than said flange portion.

9. The combination according to claim 1 wherein securing means includes a threaded stud portion on said brake shoe means for engaging a threaded aperture through said heat sink means for maintaining said coplanar surface in intimate thermally conductive relation with said generally planar surface of said heat sink means.

10. The combination according to claim 9 wherein said generally planar surface of said heat sink means is circular in form and said coplanar surface is matingly configured.

11. The combination according to claim 10 wherein said generally planar surface of said heat sink means has a peripheral lip for defining a recess therein for receiving said coplanar surface.

12. The combination according to claim 1 wherein said heat sink means includes an aperture extending therethrough and said brake shoe means includes a threaded stud portion for passage through said aperture, said heat sink means having a second surface with a concave recess formed therein, and said means for securing includes first and second washer members and a lock nut member configured for being threadably received on said stud portion, said first washer member having a convex surface for matingly engaging said concave recess, and one surface of each of said lock nut member and said second washer member being similarly configured for mating engagement, the parts being configured and dimensioned for enabling angular positioning of said stud portion relative to the slotted opening of a caliper brake arm with said first and second washer members on opposite sides of the slotted opening.

* * * * *